United States Patent
Stenzel

(10) Patent No.: US 6,491,402 B1
(45) Date of Patent: Dec. 10, 2002

(54) MIRROR MOUNTING ASSEMBLY WITH MODULAR COMPONENTS

(75) Inventor: Alexander Stenzel, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 0 days.

(21) Appl. No.: 09/390,972

(22) Filed: Sep. 7, 1999

(51) Int. Cl.⁷ .............................................. G02B 7/182

(52) U.S. Cl. ...................... 359/871; 359/872; 359/874; 248/475.1

(58) Field of Search ............................... 359/871, 872, 359/874, 875; 248/475.1, 67.4, 314

(56) References Cited

U.S. PATENT DOCUMENTS

| | | |
|---|---|---|
| 1,430,379 A | 9/1922 | Hubbell |
| 2,180,610 A | 11/1939 | Ritz-Woller |
| 2,322,431 A | 6/1943 | Fischer |
| 2,511,971 A | 6/1950 | Dalton |
| 2,652,648 A | 9/1953 | Morley |
| 2,783,015 A | 2/1957 | Kampa |
| 3,189,309 A | 6/1965 | Hager |
| 3,375,053 A | 3/1968 | Ward |
| 3,384,334 A | 5/1968 | Malachowski |
| 3,522,584 A | 8/1970 | Talbot |
| 3,642,344 A | 2/1972 | Corker |
| 3,687,443 A | 8/1972 | Anderson |
| 3,889,915 A | 6/1975 | Hashigucki et al. |
| 4,012,022 A | 3/1977 | Tomita |
| 4,077,597 A | 3/1978 | Greig |
| 4,105,295 A | 8/1978 | Skilliter, Jr. |
| 4,174,823 A | 11/1979 | Sutton et al. |
| 4,349,247 A | 9/1982 | Koyama et al. |
| 4,351,521 A | 9/1982 | Erdos |
| 4,500,063 A * | 2/1985 | Schmidt et al. .......... 248/475.1 |
| 4,512,634 A | 4/1985 | Stout |
| 4,555,166 A | 11/1985 | Enomoto |
| 4,693,571 A | 9/1987 | Kimura et al. |
| 4,696,555 A | 9/1987 | Enomoto |
| 4,730,914 A | 3/1988 | Stout |
| 4,764,004 A | 8/1988 | Yamada et al. |
| 4,804,257 A | 2/1989 | Schmidt et al. |
| 4,818,090 A | 4/1989 | Righi |
| 4,822,157 A | 4/1989 | Stout |
| 4,824,065 A | 4/1989 | Manzoni |
| 4,830,326 A | 5/1989 | Schmidt et al. |
| 4,867,408 A | 9/1989 | Ozaki |
| 4,877,214 A | 10/1989 | Toshiaki et al. |

(List continued on next page.)

FOREIGN PATENT DOCUMENTS

| | | |
|---|---|---|
| GB | 1351350 | 4/1974 |
| GB | 1517601 | 1/1977 |
| GB | 1532065 | 4/1977 |

OTHER PUBLICATIONS

Mekra Brochure, Mekra Rangau Plastics GmbH & I C. KG, pp. 1–3 and 15–57, Dec. 1995.

Primary Examiner—Mohammad Sikder
(74) Attorney, Agent, or Firm—Dority & Manning, P.A.

(57) ABSTRACT

A modular mounting assembly is provided for mounting a mirror housing to a vehicle and suitable for use with a family of mounting bars including of at least two mounting bars, each mounting bar within the family of mounting bars having a unique diameter, the modular mounting assembly including, for example, a base member configured for attachment to the mirror housing and defining a channel portion for receiving a given one of the at least two mounting bars from within the family of mounting bars, the channel portion sized for receiving at least two of the mounting bars. A given cap member selected from a family of cap members is provided configured for selective attachment to the base member, the family of cap members including at least two cap members, each cap member defining a securing portion uniquely configured to mate with a respective one of the at least two mounting bars and to secure the respective base member to one of the at least two mounting bars.

21 Claims, 3 Drawing Sheets

U.S. PATENT DOCUMENTS

| | | |
|---|---|---|
| 4,890,909 A | 1/1990 | Schmidt et al. |
| 4,915,493 A | 4/1990 | Fisher et al. |
| 4,929,074 A | 5/1990 | Urban |
| 4,938,578 A | 7/1990 | Schmidt et al. |
| 4,957,359 A | 9/1990 | Kruse et al. |
| 4,988,178 A | 1/1991 | Eifert |
| 4,991,814 A | 2/1991 | Schmidt et al. |
| 4,991,950 A | 2/1991 | Lang et al. |
| D315,710 S | 3/1991 | Ropolo |
| 5,031,871 A | 7/1991 | Ohta et al. |
| 5,044,596 A | 9/1991 | do Espitito Santo |
| 5,069,410 A | 12/1991 | McKee |
| 5,069,539 A | 12/1991 | Valde |
| 5,106,049 A | 4/1992 | Schmidt et al. |
| 5,110,196 A | 5/1992 | Lang et al. |
| 5,115,352 A | 5/1992 | do Espirito Santo |
| 5,120,015 A | 6/1992 | do Espirito Santo |
| 5,143,342 A | 9/1992 | Hutchinson et al. |
| 5,227,924 A | 7/1993 | Kerper |
| D346,357 S | 4/1994 | Englander |
| 5,301,916 A | 4/1994 | Schmidt et al. |
| 5,314,343 A | 5/1994 | Englander |
| 5,316,257 A | 5/1994 | Schmidt |
| 5,363,245 A | 11/1994 | Borello |
| 5,363,246 A | 11/1994 | Perry et al. |
| 5,433,417 A | 7/1995 | Schmidt et al. |
| 5,436,769 A | 7/1995 | Gilbert et al. |
| 5,467,230 A | 11/1995 | Boddy et al. |
| D366,235 S | 1/1996 | Schmidt et al. |
| 5,483,385 A | 1/1996 | Boddy |
| D370,882 S | 6/1996 | Schmidt et al. |
| 5,568,326 A | 10/1996 | Yoshida et al. |
| 5,576,899 A * | 11/1996 | Englander .................. 359/871 |
| 5,583,703 A | 12/1996 | Lang et al. |
| 5,604,644 A | 2/1997 | Lang et al. |
| 5,615,054 A | 3/1997 | Lang et al. |
| 5,621,577 A | 4/1997 | Lang et al. |
| 5,687,035 A | 11/1997 | Lang |
| D387,317 S | 12/1997 | Lang |
| 5,722,629 A | 3/1998 | Lang et al. |
| D397,072 S | 8/1998 | Hellhake et al. |
| 5,798,882 A | 8/1998 | Lang |
| 5,823,501 A * | 10/1998 | Schmidt et al. .......... 248/475.1 |
| D407,361 S | 3/1999 | Lang |
| D426,182 S | 6/2000 | Brown |
| 6,202,975 B1 | 3/2001 | Schmidt |

\* cited by examiner

MIRROR MOUNTING ASSEMBLY WITH MODULAR COMPONENTS

BACKGROUND OF THE INVENTION

The present invention generally relates to mirror mounting assemblies, and more particularly relates to mirror mounting assemblies with modular components that allow for minimizing the number of parts required for mounting mirrors on various differently-sized mounting bars.

Many different arrangements are known for mounting external mirrors on vehicles. On large, commercial vehicles, such as trucks and busses, mirrors are often secured within mirror housings mounted so as to extend the mirror out from the vehicle thereby providing a clear view of different areas around the vehicle. Depending on the size and design of the mirror, as well as the area around the vehicle to be observed, different mounting arrangements have been used.

One such type of mounting arrangement includes a bar extending outwardly from the vehicle, often in substantially a U-shape, in which the ends of the U-bar are attached to the side of the vehicle. Alternately, a bar may be attached to the vehicle at only one end, with a mirror housing being disposed at a distal end or central portion, or both, of such bar. In either of such applications, one mounting bar is typically attached to each side of the driver's cab of a truck for placement of at least one mirror housing. These one-piece mounting bar arrangements are often referred to in the industry as "C-loops," to differentiate them from other available types of mounting arrangements made of several interconnected, generally smaller diameter rods that are secured together, often by nuts and bolts. Some one-piece mounting bar arrangements do, however, include additional bracing members for additional support in certain applications. Examples of mirrors mounted on one-piece mounting bars are shown in U.S. Pat. Nos. 4,991,950; 5,110,196; 5,687,035; and 5,798,882 and in U.S. Design Pat. Nos. 385,243; 387,317; and 407,361.

Mirror housings may be attached to the central (upright when installed) portions of the U-bars or to the extending bars in various ways. For example, the bar may pass through the center of the mirror housing, with a clamping mechanism of some type disposed within the housing securing the mirror housing to the bar (see U.S. Pat. No. 5,687,035). Alternately, a mounting mechanism may extend from the mirror housing and be secured to the bar externally of the mirror housing (see U.S. Pat. No. 4,991,950). Both of these methods of attachment provide reliable securing of the mirror housing to the bar.

One-piece mounting bar arrangements generally provide a reliable, vibration-reducing, and sturdy mounting arrangement for mirrors. Also, one-piece mounting bar arrangements beneficially do not require assembly of several smaller rods during manufacture, installation, or repair. Also, one-piece bars favorably provide a visually streamlined styling that many people prefer on vehicles, as compared to the multi-rod designs.

The mounting bars (both U-bars and other shapes) are made in a number of different sizes, varying in outer diameter from about 14 mm to about 28 mm, depending generally on the weight of the mirror housing to be supported. Thus, if a manufacturer manufactures mirror housings for installation on variously-sized mounting bars, specifically-designed mounting equipment sets are typically required, each set being sized to fit a particular bar. Thus, in the past, vehicle mirror manufacturers have also had to manufacture various differently-sized mounting hardware sets to mount mirrors on differently-sized bars.

Being required to have several sets of mounting hardware has several drawbacks. For example, manufacturing specific differently-sized sets of mounting hardware adds expense to overall production costs of vehicle mirror assemblies. Also, production may have to be halted at times if properly-sized hardware is temporarily not available. Because part of the mounting hardware is often secured to and within the mirror housing before attachment of the mirror glass to the housing, changing the mounting hardware to fit a specific bar size could cause the further drawback of requiring someone to disassemble much of the mirror housing assembly to change out the mounting hardware. Such disassembly is time consuming and could occasionally lead to inadvertent damage to the mirror housing assembly if sufficient care is not taken during disassembly.

Also, mirror housings could be inadvertently mounted with improperly-sized mounting hardware, either during original equipment manufacture or during aftermarket modification or replacement. These mirror housings could become loose, causing the mirror housing to move so that the driver's ability to view a desired location is impaired or causing the mirror to vibrate so that reflected images of desired locations are unclear. Further, loose mirror housings could themselves be damaged, or could cause damage to the vehicle or mounting hardware.

OBJECTIVES AND SUMMARY OF THE INVENTION

In view of the above, it is a principle objective of the present invention to provide an efficient and simplified vehicle mirror mounting assembly to allow for reliable and efficient manufacture, inventory, and assembly of vehicle mirror assemblies and their constituent parts, and to allow for safe and reliable use of vehicle mirrors.

Other objectives and advantages of the invention will be made clear from the written description and claims that follow, taken in conjunction with the appended drawings, or may be learned from practice of the invention.

To achieve these objectives, and in accordance with the purposes of the invention, as embodied and broadly described and depicted herein, a modular mounting assembly is provided for mounting a mirror housing to a vehicle and suitable for use with a family of mounting bars including of at least two mounting bars, each mounting bar within the family of mounting bars having a unique diameter, the modular mounting assembly including, for example, a base member configured for attachment to the mirror housing and defining a channel portion for receiving a given one of the at least two mounting bars from within the family of mounting bars, the channel portion sized for receiving at least two of the mounting bars. A given cap member selected from a family of cap members is provided configured for selective attachment to the base member, the family of cap members including at least two cap members, each cap member defining a securing portion uniquely configured to mate with a respective one of the at least two mounting bars and to secure the base member to the respective one of the at least two mounting bars.

Optionally, the base member may include a mounting portion for contacting the mirror housing and configured so that the mirror housing is pivotable relative to the base member.

Preferably, one of the channel portion of the base member and the securing portion of each cap member defines a first surface sized to contact the respective mounting bar at a single point on the circumference of the respective mounting bar, and wherein the other of the channel portion of the base member and the securing portion of each cap member defines a second surface sized to contact the respective mounting bar at two points on the circumference of the respective mounting bar.

In accordance with another aspect of the invention, a modular mounting assembly is provided for mounting a mirror to a vehicle and suitable for use with a family of mounting bars including of at least two mounting bars, each mounting bar within the family of mounting bars having a unique diameter, the modular mounting assembly including, for example, a mirror housing for holding the mirror, and a base member attached to the mirror housing and defining a channel portion for receiving a given one of the at least two mounting bars from within the family of mounting bars, the channel portion sized for receiving at least two of the mounting bars. A given cap member selected from a family of cap members is provided configured for selective attachment to the base member, the family of cap members including at least two cap members, each cap member defining a securing portion uniquely configured to mate with a respective one of the at least two mounting bars and to secure the base member to the respective one of the at least two mounting bars.

In accordance with yet another aspect of the present invention, a modular mounting assembly is provided for mounting a mirror to a vehicle including, for example, a family of mounting bars including of at least two mounting bars, each mounting bar within the family of mounting bars having a unique diameter, the mounting bars being for securing to a vehicle, and a mirror housing for holding the mirror. A base member is attached to the mirror housing and defines a channel portion for receiving a given one of the at least two mounting bars from within the family of mounting bars, the channel portion sized for receiving at least two of the mounting bars. A given cap member selected from a family of cap members is configured for selective attachment to the base member, the family of cap members including at least two cap members, each cap member defining a securing portion uniquely configured to mate with a respective one of the at least two mounting bars and to secure the respective one of the at least two mounting bars to the base member, a given one of the cap members securing the base member to a respective mounting bar.

BRIEF DESCRIPTION OF THE DRAWINGS

The present invention will be more fully understood from the following detailed description, taken in conjunction with the accompanying drawings, wherein like reference numerals refer to like parts, and in which.

DETAILED DESCRIPTION OF PREFERRED EMBODIMENT

Figure 1:
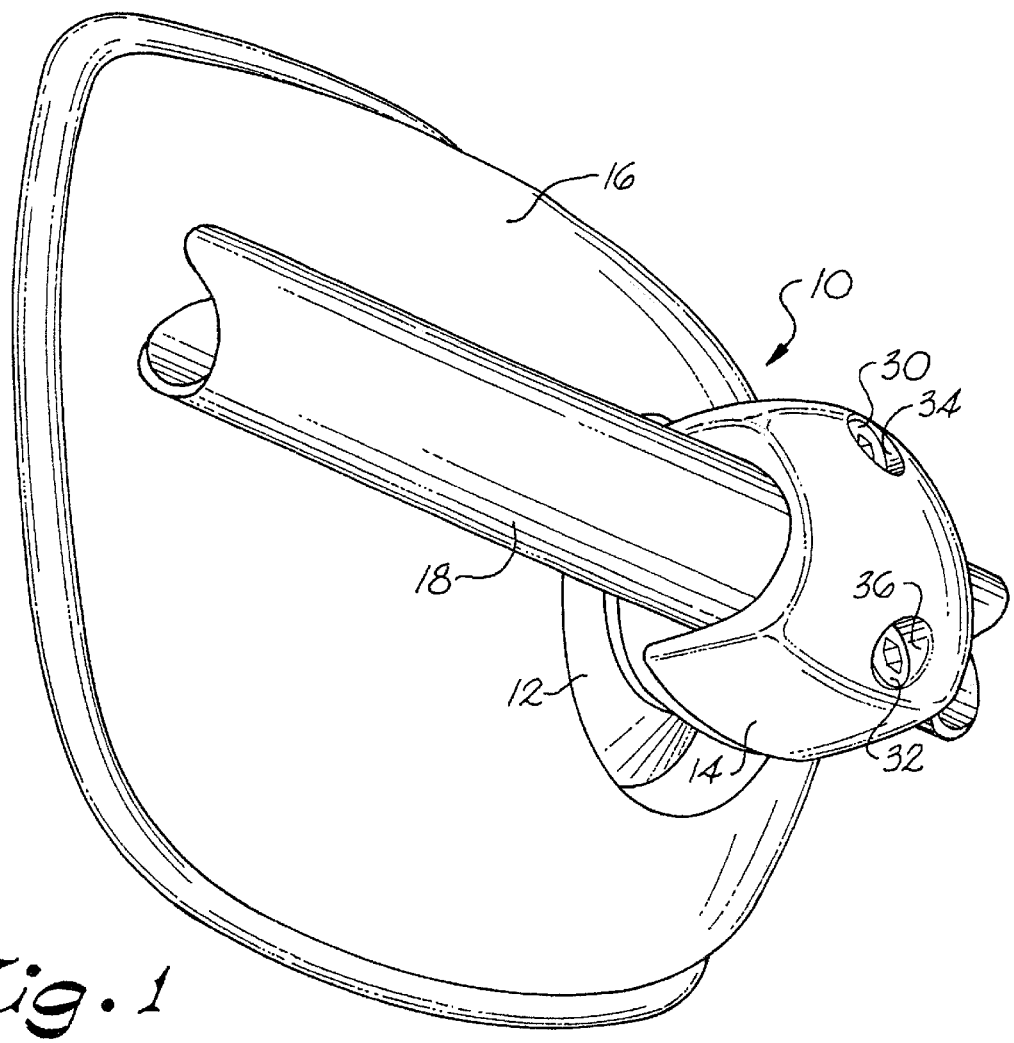
FIG. 1 is a perspective view of the mirror mounting assembly of the present invention, as utilized on a mirror housing mounted to a mounting bar of a vehicle.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment or figure can be used on another embodiment or figure to yield yet another embodiment. It is intended that the present invention include such modifications and variations.

One exemplary example of a mirror mounting assembly with modular components made according to the present invention is broadly embodied in FIGS. 1–4. The modular mounting assembly is suitable for mounting a mirror to a vehicle and, as will be discussed below, is suitable for use with a family of mounting bars, each having a unique diameter. As depicted in FIGS. 1–4, the mirror mounting assembly, identified generally with reference numeral 10, includes a base member 12 and a cap member 14. Base member 12 is configured for attachment to a mirror housing 16 and is secured to a mounting bar 18 by cap member 14. Mounting bar 18 is to be secured to a vehicle (not shown) in any conventional manner, and may comprise a U-bar, an extending bar, or any other type of mounting bar.

Figure 2:
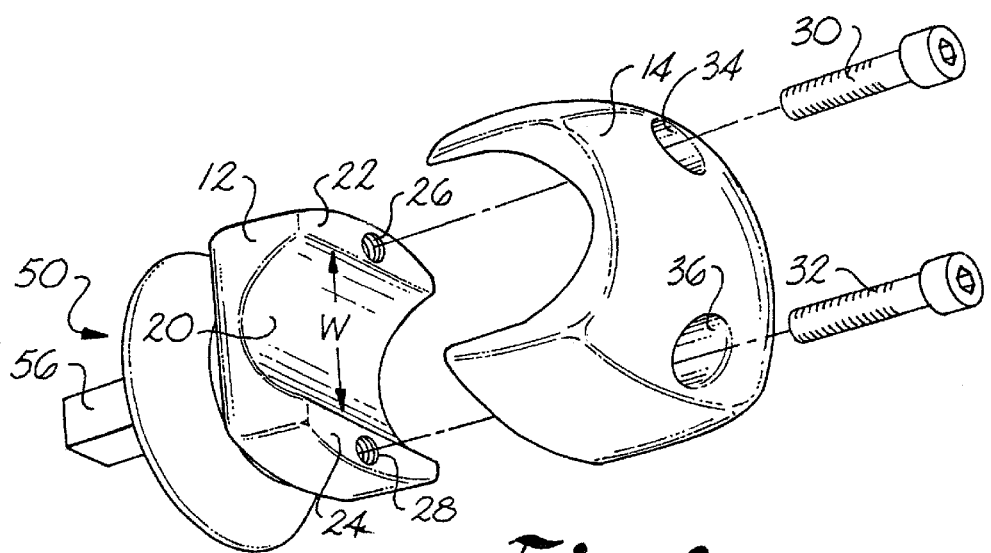
FIG. 2 is an exploded-perspective view of the mirror mounting assembly of FIG. 1.

In accordance with the invention, base member 12 defines a channel portion 20 for receiving mounting bar 18. As shown in FIG. 2, channel portion 20 is preferably a curved surface, but channel portion 20 may have other cross-sectional shapes within the scope of the invention. For example, channel portion 20 could have a substantially rectangular or trapezoidal cross-section if desired. The cross-sectional shape of channel portion 20 may be dictated or influenced by the method and material of manufacture of base member 12.

Channel portion 20 of base member is sized for receiving mounting bars of different sizes (i.e., of different outer diameters). Thus, the width w and cross-sectional shape of channel portion 20 should be such that at least two differently-sized mounting bars can be received in channel portion 20. As presently used mounting bars are typically from about 14 mm to about 28 mm in outer diameter, channel portion 20 should be sized accordingly to accept mounting bars within that range. Preferably, channel portion 20 is sized to receive mounting bars within the entire range of mounting bars in use (including those in the 14–28 mm range) to enjoy the maximum extent of the efficiency and modularity provided by the present invention.

Base member 12 includes raised sides 22, 24 flanking channel portion 20. Threaded holes 26, 28 may be defined in sides 22, 24 for receiving threaded bolts 30, 32 to provide one possible means to attach cap member 14 to base member 12. Alternate means may be used to attach cap member 14 to base member 12, such as nuts and bolts, screws, clips, hinges, collet pins, etc. Preferably, cap member 14 is removably and adjustably attached to base member 12 to allow for repair, replacement, or adjustment of mirror housing 16 relative to mounting bar 18. Cap member 14 may include countersunk bores 34, 36 and coaxial holes 38, 40 for receiving and seating threaded bolts 30, 32.

In accordance with the invention, cap member 14 defines a securing portion 42 for contacting mounting bar 18 and securing base member 12 to mounting bar 18. Securing portion 42 is sized to as to accept and reliably secure to base member 12 mounting bars within a portion of the entire range of mounting bars in use. Securing portion 42 is preferably sized so as to be able to accept half (or slightly more than half) of the 14–28 mm range discussed above. Thus, securing portion 42 may be configured and sized so as to receive mounting bars 18 of from 14–21 mm or from 20–28 mm in outer diameter. As shown, securing portion 42 defines a curved cross-section. However, securing portion 42 may have other cross-sectional shapes within the scope of the present invention.

Figure 3C:
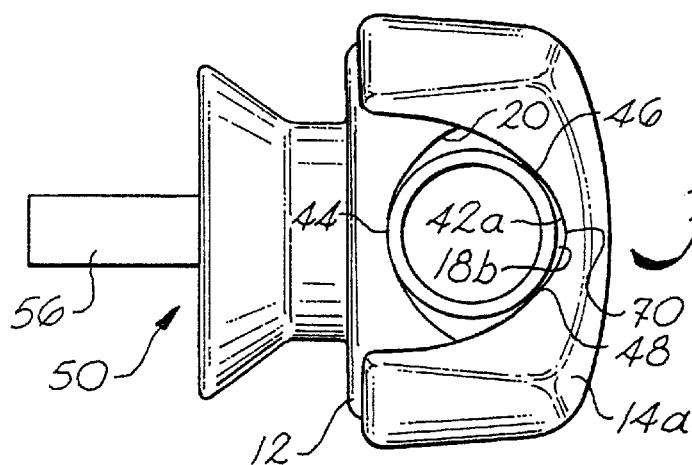
FIG. 3c is a side view of the mirror mounting assembly according to the present invention showing a second of two respective differently-sized cap pieces mounted on the common base piece hold another differently-sized mounting bar.
Figure 3B:
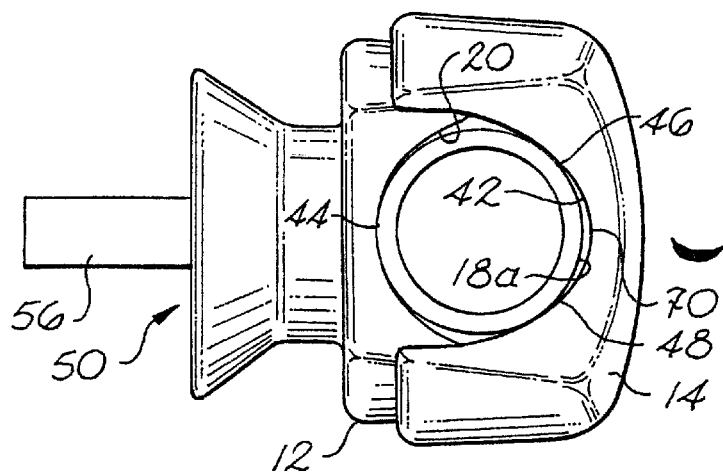
FIGS. 3a 3b are side views of the mirror mounting assembly according to the present invention, each showing a first of two respective differently-sized cap pieces mounted on a common base piece, each cap piece holding a differently-sized mounting bar.
Figure 3A:
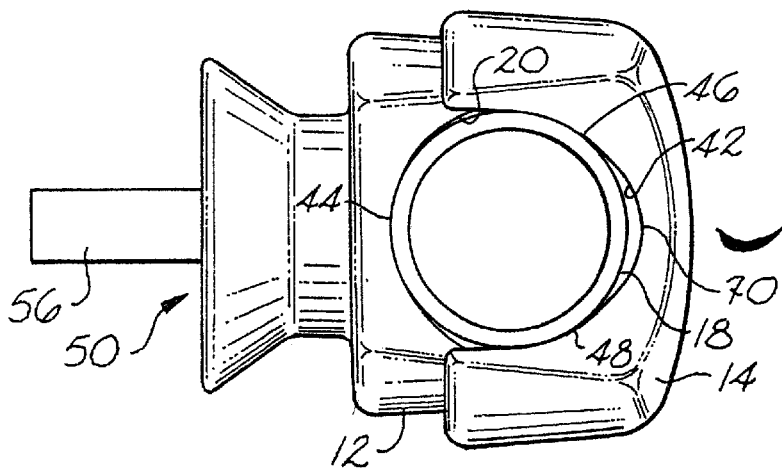

As shown in FIG. 3A, preferably one of channel portion 20 and securing portion 42 defines a first surface sized to contact mounting bar 18 at a single point 44 on the circumference of mounting bar 18, and the other of the channel portion 20 and securing portion 42 defines a second surface sized to contact mounting bar 18 at two points on such circumference. Thus, it is preferable that mounting bar 18 be supported by contact at three points about its circumference. Preferably, point 44 contacts channel portion 20 and points 46, 48 contact securing portion 42, in order to best achieve modularity and efficient sizing of base member 12 and cap member 14, as will be described below.

Figure 4:
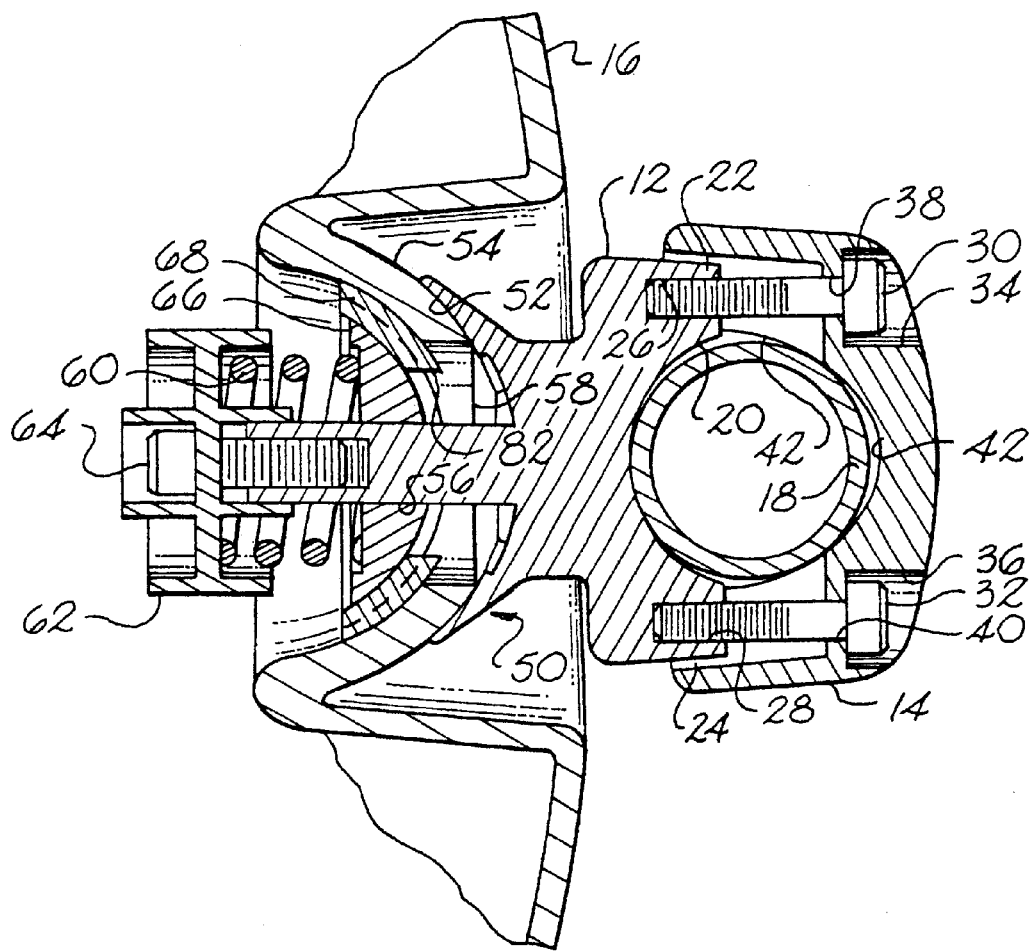
FIG. 4 is a partial sectional view of a mirror mounting assembly according to the present invention showing the cap and base parts secured together by threaded bolts and secured to a portion of the mirror housing.

As shown best in FIG. 4, base member 12 includes a mounting portion 50 for contacting mirror housing 16 and configured so that mirror housing 16 is pivotable relative to base member 12. Accordingly, mounting portion 50 may in one embodiment include a spherical surface 52 contacting a mating surface 54 of mirror housing 16, and a bar 56 extending into mirror housing 16 via an opening 58. A compression spring 60 is held in place by a stop 62 and a threaded bolt 64. Slide members 66,68 are disposed between spring 60 and housing 16 to allow for motion of base member 12 relative to mirror housing 16. Mounting portion 50 may have other designs and components within the scope of the invention. Attachments may also be provided to connect mounting portion 50 to an actuator or actuators, if remote movement of mirror housing 16 is desired.

In accordance with the invention, the cap member 14 is selected from a family of cap members 14, 14a (see FIGS. 3A–C) configured for selective attachment to base member 12. The selection of a cap member 14 or 14a is made depending on which mounting bar out of a family of mounting bars 18, 18a, or 18b (see FIGS. 3A–C) is used to mount the mirror housing 16.

As shown in FIGS. 3A and 3B, a common cap member 14 is used to secure base member 12 to two separately sized mounting bars 18 and 18a, respectively. However, when the smallest depicted mounting bar 18b is chosen, cap 14a is used (FIG. 3C) to secure base member 12 to mounting bar 18b.

As shown in FIGS. 3A–3C, central point 70 or securing portion 42 of cap member 14 is spaced from mounting bar 18,18a,18b by a small distance (a millimeter or two). This spacing is achieved, in situations where a curved securing portion 42 is utilized, by designing securing portion so that the radius of curvature at central point 70 is a small amount (up to three millimeters) less than that of the smallest mounting bar to be used with the particular cap member 14.

Base member 12 and cap member 14 are preferably made of a cast metal such as aluminum, mounting bar 18 are preferably made of steel, although all could be made of a plastic such as nylon, if desired. The materials selected should allow for secure and reliable attachment together and resist movement once so secured. If desired, frictional coatings or surface treatments may be used to increase the attachment. It should be clearly understood that the choice of only depicting three different mounting bar diameters in FIGS. 3A–C is intended to be exemplary only, in that mounting bar diameters are not limited to only three different sizes. Rather, virtually any integer millimeter size between 14 and 28 may be employed, as well as numerous correspondingly-sized bars measured in inches. Well over a dozen or more different bar sizes exist or may be utilized for mounting bars. Thus, providing a modular mounting system using only two different sizes of cap member and one size of base member provides dramatic savings in the number of differently-sized parts required to mount mirror housings on mounting bars.

Also, it is possible to use more than two cap members 14 with 14–28 mm mounting bars. Thus, three or more cap members 14 could be used for such range. However, using only two is clearly preferred, as additional cap members reduce the benefits of the modularity of the present invention.

It will be apparent to those skilled in the art that various modifications and variations can be made in the present invention without departing from the scope and spirit of the invention. For example, the particular shape of the base member 12 and the cap member 14 could be modified within the scope of the invention. Also, the present invention could be applied equally well to mirror housings where the mounting bar passes through the housing. In such situations, the base member could comprise a separate piece, or it could be formed integral with the mirror housing. Either way, the benefits of the inventive mirror mounting assembly with modular components would still be available to such a housing. It is intended that the present invention include such modifications and variations as come within the scope of the appended claims and their equivalents.

I claim:

1. A modular mounting assembly for mounting a mirror housing to a vehicle and suitable for use with a family of mounting bars including of at least two mounting bars, each mounting bar within the family of mounting bars having a unique diameter, the modular mounting assembly comprising:

a base member configured for attachment to the mirror housing and defining a channel portion for receiving a given one of the at least two mounting bars from within the family of mounting bars, the channel portion sized for receiving at least two of the mounting bars; and a given cap member selected from a family of cap members configured for selective attachment to the base member, the family of cap members including at least two cap members, each cap member defining a securing portion uniquely configured to mate with a respective one of the at least two mounting bars and to secure the base member to the respective one of the at least two mounting bars.

2. The modular mounting assembly of claim 1, further including a means for attaching the given cap member to the base member.

3. The modular mounting assembly of claim 2, wherein the means for attaching includes threaded bolts.

4. The modular mounting assembly of claim 1, wherein the family of cap members includes three cap members.

5. The modular mounting assembly of claim 1, further including a mirror housing secured to the base member.

6. The modular mounting assembly of claim 5, wherein the mirror housing includes a mirror glass.

7. The modular mounting system of claim 5, wherein the base member includes a mounting portion for contacting the mirror housing and configured so that the mirror housing is pivotable relative to the base member.

8. The modular mounting assembly of claim 1, further including a mounting bar secured between the base member and the given cap member that defines a securing portion that mates with the mounting bar, the mounting bar for securing the mirror housing to a vehicle.

9. The modular mounting system of claim 8, wherein the mounting bar is a U-bar.

10. The modular mounting system of claim 1, wherein one of the channel portion of the base member and the securing portion of each cap member defines a first surface sized to contact the respective mounting bar at a single point on the circumference of the respective mounting bar, and wherein the other of the channel portion of the base member and the securing portion of each cap member defines a second surface sized to contact the respective mounting bar at two points on the circumference of the respective mounting bar.

11. A modular mounting assembly for mounting a mirror to a vehicle and suitable for use with a family of mounting bars including of at least two mounting bars, each mounting bar within the family of mounting bars having a unique diameter, the modular mounting assembly comprising:
  a mirror housing for holding the mirror;
  a base member attached to the mirror housing and defining a channel portion for receiving a given one of the at least two mounting bars from within the family of mounting bars, the channel portion sized for receiving at least two of the mounting bars; and
  a given cap member selected from a family of cap members configured for selective attachment to the base member, the family of cap members including at least two cap members, each cap member defining a securing portion uniquely configured to mate with a respective one of the at least two mounting bars and to secure the base member to the respective one of the at least two mounting bars.

12. The modular mounting assembly of claim 11, further including a means for attaching the given cap member to the base member.

13. The modular mounting assembly of claim 11, wherein the mirror housing includes a mirror glass.

14. The modular mounting system of claim 11, wherein the base member includes a mounting portion contacting the mirror housing and configured so that the mirror housing is pivotable relative to the base member.

15. The modular mounting assembly of claim 11, further including a mounting bar secured between the base member and the given cap member that defines a securing portion that mates with the mounting bar, the mounting bar for securing the mirror housing to a vehicle.

16. The modular mounting system of claim 11, wherein one of the channel portion of the base member and the securing portion of each cap member defines a first surface sized to contact the respective mounting bar at a single point on the circumference of the respective mounting bar, and wherein the other of the channel portion of the base member and the securing portion of each cap member defines a second surface sized to contact the respective mounting bar at two points on the circumference of the respective mounting bar.

17. A modular mounting assembly for mounting a mirror to a vehicle comprising:
  a family of mounting bars including of at least two mounting bars, each mounting bar within the family of mounting bars having a unique diameter, the mounting bars being for securing to a vehicle;
  a mirror housing for holding the mirror;
  a base member attached to the mirror housing and defining a channel portion for receiving a given one of the at least two mounting bars from within the family of mounting bars, the channel portion sized for receiving at least two of the mounting bars; and
  a given cap member selected from a family of cap members configured for selective attachment to the base member, the family of cap members including at least two cap members, each cap member defining a securing portion uniquely configured to mate with a respective one of the at least two mounting bars and to secure the respective one of the at least two mounting bars to the base member, the given cap member securing the base member to a respective mounting bar.

18. The modular mounting assembly of claim 17, further including a means for attaching the given cap member to the base member.

19. The modular mounting assembly of claim 17, wherein the mirror housing includes a mirror glass.

20. The modular mounting system of claim 17, wherein the base member includes a mounting portion contacting the mirror housing and configured so that the mirror housing is pivotable relative to the base member.

21. The modular mounting system of claim 17, wherein one of the channel portion of the base member and the securing portion of each cap member defines a first surface sized to contact the respective mounting bar at a single point on the circumference of the respective mounting bar, and wherein the other of the channel portion of the base member and the securing portion of each cap member defines a second surface sized to contact the respective mounting bar at two points on the circumference of the respective mounting bar.

* * * * *